INVENTORS
JACK HUEBLER
JAMES L. JOHNSON
FRANK C. SCHORA, JR.
PAUL B. TARMAN
PETER S. PANOS

ATTORNEY

INVENTORS
JACK HUEBLER
JAMES L. JOHNSON
FRANK C. SCHORA, JR.
PAUL B. TARMAN
PETER S. PANOS

BY D. Leigh Fowler, Jr.
ATTORNEY

United States Patent Office 3,539,292
Patented Nov. 10, 1970

3,539,292
STEAM-IRON PROCESS FOR AMMONIA
SYNTHESIS GAS PRODUCTION
Jack Huebler, Deerfield, James L. Johnson, Chicago, Frank C. Schora, Jr., Palatine, Paul B. Tarman, Evergreen Park, and Peter S. Panos, Chicago, Ill., assignors to Consolidation Coal Company, Pittsburgh, Pa., a corporation of Delaware
Continuation-in-part of abandoned application Ser. No. 477,769, Aug. 6, 1965. This application Mar. 7, 1968, Ser. No. 711,379
Int. Cl. C01b 1/08; C01c 1/04; B01j 9/00
U.S. Cl. 23—199
6 Claims

ABSTRACT OF THE DISCLOSURE

In an ammonia synthesis wherein part of the requisite hydrogen is supplied by the steam-iron process, the improvement which comprises using purge gases from the ammonia synthesis to assist in the reduction step of the steam-iron process.

---

This application is a continuation-in-part of our co-pending application, Ser. No. 477,769, filed Aug. 6, 1965, now abandoned.

This invention relates to the production of ammonia via the steam-iron process. In particular, this invention relates to methods for improving the overall process efficiency of ammonia production wherein the feed hydrocarbon requirements are reduced and the process is thereby rendered more economical.

Ammonia synthesis gas, i.e. gas containing nitrogen and hydrogen in the proper ratio for conversion to ammonia, is conventionally produced by steam reforming of methane, wherein natural gas (methane) is reacted with air and steam in a catalytic reformer to produce a gas consisting of carbon monoxide, carbon dioxide, hydrogen, water, nitrogen, argon, and residual methane. These gases are further treated by water gas shift, carbon dioxide removal, and methanation equipment to produce ammonia synthesis gas substantially free of carbon monoxide, carbon dioxide, and water.

The process is known for producing ammonia synthesis gas which uses the steam-iron process for producing hydrogen which serves as an adjunct to the nitrogen and hydrogen produced by the partial oxidation of natural gas (see U.S. Pat. No. 2,014,757). The steam-iron process uses a reducing gas to reduce iron oxides which then are reacted with steam to produce hydrogen.

The ammonia synthesis gas, however produced, is then reacted in a conventional ammonia synthesis loop at elevated pressures to produce ammonia. Because of the recycle nature of ammonia synthesis, the loop system must be continuously purged to prevent accumulation of residual gases, such as argon and methane. These purge gases contain considerable amounts of nitrogen and hydrogen which must be discarded and, as a result, the overall efficiency of the process is decreased.

Recent advances in ammonia synthesis have resulted in lowering of ammonia loop operating pressures from about 5000 p.s.i.a. to substantially lower pressures with a net decrease in operating costs because of decreased compression expenses. However, the savings are offset to a degree by a necessary increase in the volume of purge bled from the synthesis loop. For example, at 2300 p.s.i.g. an amount of gas equivalent to about 10% of the feed synthesis gases is purged from the loop.

These purge gases comprise about 69 percent hydrogen, 23 percent nitrogen, 6 percent methane, 2 percent argon, traces of ammonia and other impurities, and would be considered a low quality heating value gas (about 280 B.t.u./s.c.f.). Purge gases are normally burned to recoup their thermal energy in a conventional plant.

In accordance with our invention, these purge gases are used in the steam-iron process to effect a more efficient operation when using such process for ammonia synthesis gas production. In the preferred embodiment of the steam-iron process, two reactors are used: a reductor to produce reduced iron oxides by reaction of a suitable reducing gas with iron oxides, and an oxidizer to produce hydrogen by reaction of steam with the reduced iron oxides. Admission of the ammonia loop purge gases to the reductor increases the production of reduced iron oxides and subsequently increases the hydrogen production in the oxidizer. Since the spent reducing gas is not used as a portion of ammonia synthesis gas in this invention, there can be no additional accumulation in the synthesis loop of undesirable residual gases, such as argon. In fact, methane in the purge gases can react in the reductor to form additional hydrogen and carbon monoxide and increase the reducing potential of the reducing gas resulting in even further increases in hydrogen production in the oxidizer. Increases in hydrogen production are reflected as decreases in feedstock requirements to the partial oxidizer in the production of the reducing gas. This is an important economic consideration because the feedstock material is the principal operating expense in ammonia manufacture.

Thus, it is the essence of this invention to produce ammonia by combining the partial oxidation of natural gas, other hydrocarbons, or carbonaceous fuels with the steam-iron process to effect substantial economic savings by injecting the ammonia synthesis loop purge gases into the reductor of the steam-iron process.

It is an object of this invention to produce ammonia by the steam-iron process wherein the pressure energy of the ammonia loop purge gases is more efficiently recovered by injecting these gases into the reductor of the steam-iron process.

It is yet another object of this invention to produce ammonia using the steam-iron process wherein methane in the ammonia loop purge gases reacts in the reductor of the steam-iron process to substantially decrease natural gas feed requirements.

Other objects of this invention will become apparent as the invention is more fully described hereinafter.

Figure 1:
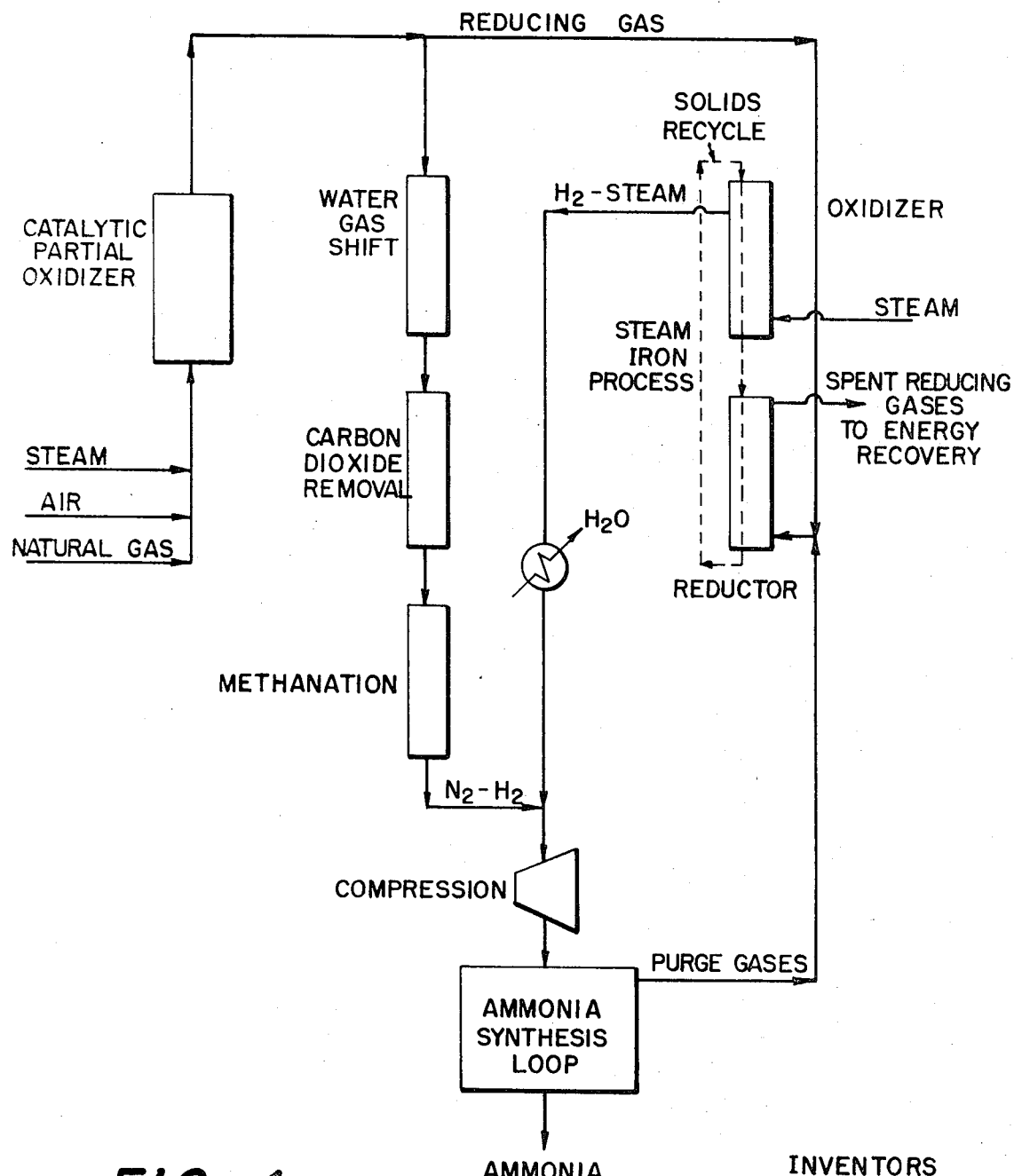
FIG. 1 is a flow diagram showing the process steps of this invention.

In the process of the invention as shown broadly in FIG. 1, natural gas, air, and steam enter the catalytic partial oxidizer wherein high quality reducing gas (high carbon monoxide plus hydrogen content) is produced. Such process and apparatus effecting it are well known in the art. As an alternative to natural gas feedstock, higher hydrocarbons may be used as the hydrocarbon feed. It is also possible to produce this high quality reducing gas by partial oxidation of coal or other carbonaceous materials. The product reducing gas stream is then split, some used in the reductor of the steam-iron process for reducing iron oxide, the rest used to supply the necessary nitrogen for the ammonia synthesis loop. The latter stream is passed through conventional water gas shift, carbon dioxide removal, and methanation equipment as shown diagrammatically in FIG. 1, yielding nitrogen, hydrogen, and residuals, such as methane and argon. Additional hydrogen to obtain the proper stoichiometric mixture of hydrogen and nitrogen for the ammonia synthesis loop is obtained from the steam-iron process wherein reducing gas reacts with the iron oxide solids in the reductor to produce a reduced form of iron oxide (elemental iron and ferrous oxide). The reduced form of iron oxide is recirculated to the oxidizer and contacted with steam to produce the necessary hydrogen. The steam-hydrogen mixture is then cooled to condense steam and the residual hydrogen is mixed with gas from the methanator and fed to the ammonia synthesis loop.

Because the spent reducing gases from the reductor do not enter the synthesis loop, any inert gases added to the feed reducing gas will not accumulate in the system. This addition of the loop purge gases to the reducing gas feed to the reductor subsequently decreases feedstock requirements to the partial oxidizer. Thus, as shown in FIG. 1, the purge gases are fed to the steam-iron process reductor and are used as supplemental reducing gas to augment the reducing gas from the partial oxidizer.

Figure 2:
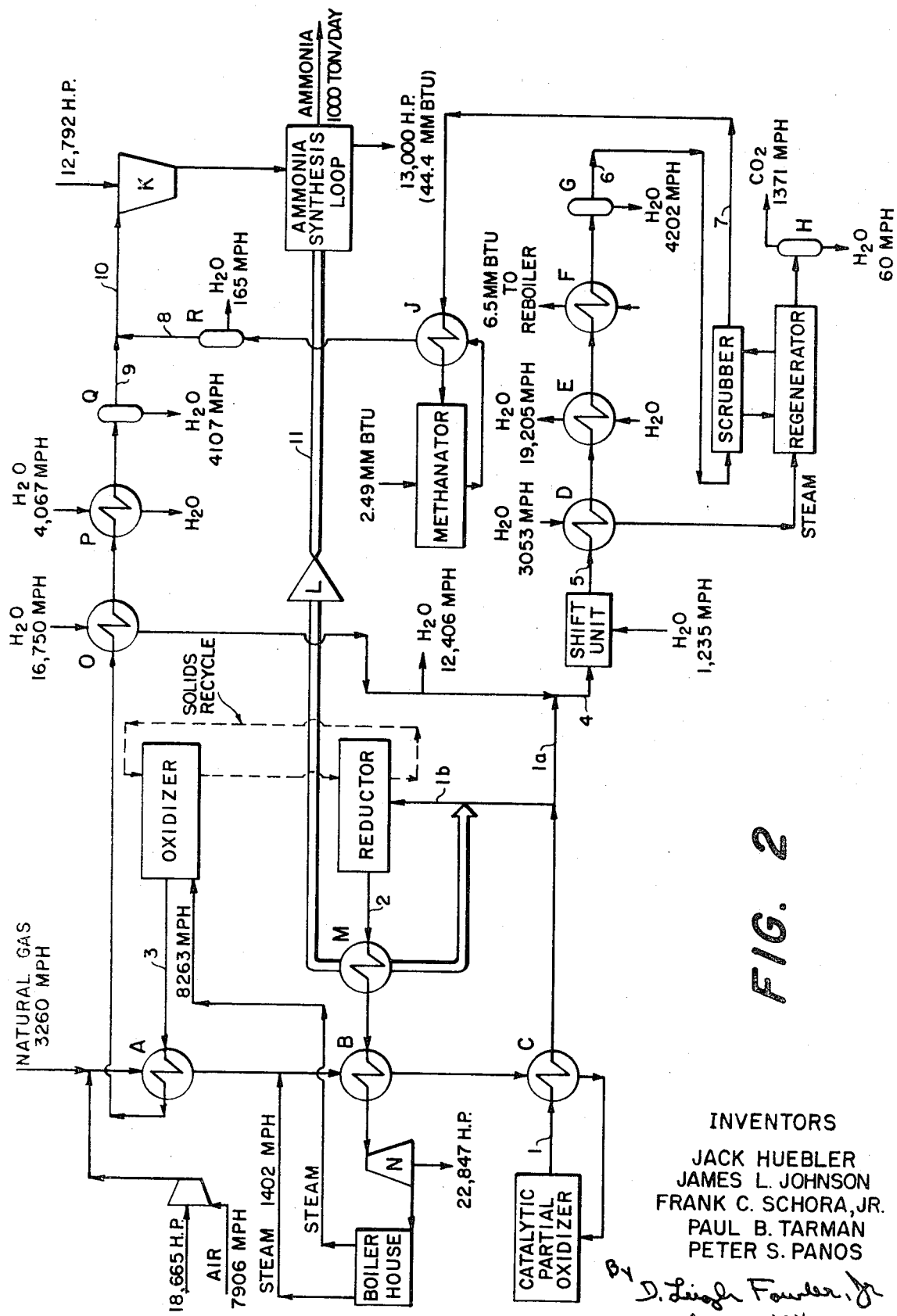
FIG. 2 is a detailed flow diagram for a 1000 ton/day ammonia plant using the improved process of the invention.

A detailed flow diagram of a 1000 ton/day ammonia plant using the process of our invention is shown in FIG. 2. All the necessary energy required for process operation is developed within the process. When using the process of this invention—utilizing the loop purge gases in the reductor—there is required only 29,600 s.c.f. natural gas/ton ammonia as compared to requirements of 32,000 to 42,000 s.c.f. natural gas/ton ammonia for conventional ammonia plants now in operation. Thus, the natural gas requirements, which account for almost two-thirds of total manufacturing costs of a 1000 ton/day ammonia plant, can be reduced 15 to 30 percent by use of the process described herein. In conventional operation, about 17 percent of the feed natural gas is required to maintain reformer temperatures. The economic advantage to be had with this process is self-evident.

The following description of the invention should be read in conjunction with Table I which describes the various gas streams identified in FIG. 2. The moles of material fed, or formed, in the process are shown in FIG. 2, and indicated by the letters m.p.h., i.e. moles per hour.

In the operation of the process, air is compressed to 470 p.s.i.a., mixed with natural gas to attain 395° F., and heated in heat exchanger A to 860° F., exchanger B to 1125° F., and exchanger C to 1520° F. Because of the combustibility of the gas air premix, premix velocities in the exchanger coils should exceed about 40 feet/sec. in A for temperatures up to about 900° F., 100 feet/sec. in B and 200 feet/sec. in C. Steam is added to the premix before it enters exchanger B to inhibit combustion and carbon deposition reactions in the higher temperature exchangers. These gases are converted to reducing gases in the catalytic partial oxidizer which operates at a nominal temperature of 1500° F. to 2200° F. and a pressure of 470 p.s.i.a. If desired, the natural gas, air, and steam can be separately heated to 1520° F., mixed and fed to the catalytic partial oxidizer.

The product reducing gases from the catalytic partial oxidizer pass through heat exchanger C and are cooled to 1500° F., and then split into two streams, one for the reductor, the other for the water gas shift unit. The smaller portion is admixed with water, which flashes to steam, and is fed to the water gas shift reactor to convert the carbon monoxide by reaction with steam and carbon dioxide to hydrogen.

These product gases pass through exchangers D, E, F and water knockout pot G, and enter the carbon dioxide removal system which consists of a scrubber, regenerator and water knockout pot H. The scrubbed gases pass through exchanger J and enter the methanator where the residual carbon oxides are almost completely removed by formation of methane to prevent poisoning of the ammonia synthesis catalyst in the ammonia synthesis loop. The methanated gases are (1) passed through exchanger J, (2) passed through water knockout pot R, (3) admixed with hydrogen from the steam-iron process, and (4) compressed in compressor K to ammonia synthesis loop pressure at 2300 p.s.i.a. in this example.

The ammonia loop system, here illustrated, produces 1000 tons/day of ammonia and 1,189 moles/hour of purge gas at 100° F. The purge gases are reduced in pressure from 2300 to 470 p.s.i.a. in pressure reducer L. Because of the small volumetric flow rate, pressure energy is not recovered in this pressure reduction. The purge gases are then heated in exchanger M to 1500° F. and admixed with the larger portion of reducing gases from the catalytic partial oxidizer to improve the reducibility of the feed gases to the reductor of the steam-iron process.

In the reductor, the improved reducing gases are contacted countercurrently with downwardly moving iron oxide solids reducing them to lower oxide forms (elemental iron plus ferrous oxide). The spent reducing gases pass through exchangers M and B and expander N generating about 23,000 H.P. The expanded gases are further utilized in the boiler house to generate steam which is used for process feed steam. Of the total energy extracted from the spent reducing gases, over 10 percent results from the purge gases added to the feed reducing gas. Thus, in contrast to conventional operation, about 80 percent of the pressure energy in the purge gases is recovered by admixing them with the reducing gas feed.

The reduced iron oxides from the reductor enter the oxidizer and are contacted with steam to produce a steam-hydrogen product mixture. This mixture is passed through exchanger A, and through exchanger O which heats water for the water gas shift system. The mixture is further cooled in exchanger P and water is removed in knock-out pot Q. The pure hydrogen remaining is then admixed with the methanated gases to yield a proper stoichiometric ratio of hydrogen and nitrogen for ammonia synthesis.

The above example shown diagrammatically in FIG. 2 serves to illustrate a specific application of this invention. Modifications of equipment and operating conditions can easily be made by those skilled in the art to utilize more advantageously a specific type of feedstock material and are considered within the scope of this invention.

We claim:

1. In an ammonia synthesis loop which is supplied with

TABLE I.—STREAM VOLUMES AND COMPOSITION

| Stream No. | $H_2$ | CO | $CO_2$ | $CH_4$ | $N_2$ | A | $H_2O$ | Gas flow | |
|---|---|---|---|---|---|---|---|---|---|
| | | | | | | | | Moles/hr. | MMs.c.f./hr. |
| 1 | 37.25 | 16.54 | 1.74 | 0.68 | 35.86 | 0.46 | 7.47 | 17,192 | 6.51 |
| 1a | 37.25 | 16.54 | 1.74 | 0.68 | 35.86 | 0.46 | 7.47 | 7,581 | 2.87 |
| 1b | 40.70 | 14.72 | 1.55 | 1.22 | 34.43 | 0.73 | 6.65 | 10,800 | 4.09 |
| 2 | 12.55 | 4.55 | 11.71 | 1.22 | 34.43 | 0.73 | 34.81 | 10,800 | 4.09 |
| 3 | 50.08 | | | | | | 49.92 | 8,263 | 3.13 |
| 4 | 23.68 | 10.51 | 1.11 | 0.43 | 22.80 | 0.29 | 41.18 | 11,925 | 4.51 |
| 5 | 30.92 | 0.06 | 10.47 | 0.39 | 20.66 | 0.26 | 37.24 | 13,160 | 4.98 |
| 6 | 45.42 | 0.09 | 15.38 | 0.58 | 30.35 | 0.39 | 7.79 | 8,958 | 3.39 |
| 7 | 57.75 | 0.12 | 0.10 | 0.73 | 38.58 | 0.49 | 2.23 | 7,047 | 2.67 |
| 8 | 58.63 | | | 0.97 | 39.68 | 0.51 | 0.21 | 6,852 | 2.59 |
| 9 | 99.80 | | | | | | 0.20 | 4,147 | 1.57 |
| 10 | 74.14 | | | 0.61 | 24.72 | 0.32 | 0.21 | 10,999 | 4.16 |
| 11 | 68.60 | | | 5.60 | 22.88 | 2.92 | | 1,189 | 0.45 | supplemental hydrogen by the steam-iron process, the improvement which comprises using purge gases from said ammonia synthesis loop to reduce iron oxides formed in said steam-iron process.

2. In the process for producing ammonia in an ammonia synthesis loop from a synthesis gas obtained by the partial oxidation of a hydrocarbonaceous feedstock, wherein the hydrogen content of said synthesis gas is supplemented by hydrogen supplied by a steam-iron system containing an oxidizer and reductor, the improvement which comprises feeding purge gases from said ammonia synthesis loop to said reductor of said steam-iron system.

3. In a process for producing ammonia comprising the following steps:
(a) reacting air with a hydrocarbonaceous feedstock either with or without the addition of steam to produce reducing gas comprising carbon monoxide, hydrogen, nitrogen, steam, carbon dioxide, and residuals such as methane, argon, and other impurities;
(b) reacting a portion of the reducing gas from step (a) by water gas shift reaction, carbon dioxide removal and by methanation reaction to remove residual carbon oxides, thereby producing a synthesis gas comprising essentially nitrogen and hydrogen; and
(c) producing hydrogen-rich gas by the steam-iron process for admixture with said synthesis gas for feeding to an ammonia synthesis loop, the improvement which comprises feeding purge gases from said ammonia synthesis loop to the reductor of said steam-iron process to increase the efficiency of the reductor reducing gas in said steam-iron process.

4. Process for producing ammonia from synthesis gas containing hydrogen and nitrogen in required stoichiometric ratio comprising the following steps:
(a) reacting air with a hydrocarbonaceous feedstock, either with or without the addition of steam, by catalytic partial oxidation to produce reducing gas comprising carbon monoxide, hydrogen, nitrogen, steam, carbon dioxide and residual methane and argon;
(b) feeding a portion of said gas produced in step (a) successively to water gas shift reactor, carbon dioxide removal apparatus and methanation reactor to remove residual carbon oxides, thereby producing a gas essentially composed of nitrogen and hydrogen;
(c) feeding the balance of gas from step (a) to the reductor reactor of a steam-iron process apparatus, and withdrawing hydrogen from the oxidizer reactor of said apparatus;
(d) admixing hydrogen from step (c) with gas resulting from step (b) to produce the required stoichiometric ratio for ammonia synthesis and feeding said admixture to an ammonia synthesis loop; and
(e) feeding purge gas from said synthesis loop to the reductor of said steam-iron process apparatus whereby said purge gas augments the reducing gas requirements in step (c) and substantially reduces the requirement for hydrocarbonaceous feedstock in step (a).

5. Process of claim 4 wherein said hydrocarbonaceous feedstock in step (a) is natural gas.

6. Process of claim 5 wherein catalytic partial oxidation of step (a) is effected at a pressure above 300 p.s.i.g., and a temperature between 1500° and 2200° F.

References Cited
UNITED STATES PATENTS

| | | | |
|---|---|---|---|
| 1,613,405 | 8/1922 | Mott | 23—199 |
| 2,610,106 | 9/1952 | Gray | 23—199 |
| 2,014,757 | 9/1935 | Blondelle | 23—198 |

EARL C. THOMAS, Primary Examiner

H. S. MILLER, Assistant Examiner

U.S. Cl. X.R.

23—214, 289